United States Patent [19]

Yagi

[11] Patent Number: 5,018,066
[45] Date of Patent: May 21, 1991

[54] SYSTEM FOR PROCESSING SALES DATA ON SLIPS USED IN RESTAURANTS

[75] Inventor: Shinichi Yagi, Tokyo, Japan

[73] Assignee: Casio Computer Co., Ltd., Tokyo, Japan

[21] Appl. No.: 283,023

[22] Filed: Dec. 9, 1988

Related U.S. Application Data

[63] Continuation of Ser. No. 868,636, May 29, 1988, abandoned.

[30] Foreign Application Priority Data

Jun. 17, 1985 [JP] Japan .................. 60-131383

[51] Int. Cl.⁵ .............................. G06F 15/20
[52] U.S. Cl. ..................... 364/405; 364/404
[58] Field of Search ............ 364/404, 405, 200, 900; 235/379

[56] References Cited

U.S. PATENT DOCUMENTS

| | | | |
|---|---|---|---|
| 3,748,452 | 7/1973 | Ruben | 29/865 |
| 4,319,326 | 3/1982 | Uchida | 364/900 |
| 4,360,872 | 11/1982 | Suzuki et al. | 364/405 |
| 4,396,985 | 8/1983 | Ohara | 364/405 |
| 4,398,250 | 8/1983 | Hosono | 364/404 |
| 4,493,038 | 1/1985 | Bovio et al. | 364/405 |
| 4,502,120 | 2/1985 | Ohnishi et al. | 364/405 |
| 4,594,664 | 6/1986 | Hashimoto | 364/405 |
| 4,626,990 | 12/1986 | Komai et al. | 364/405 |
| 4,771,382 | 9/1988 | Shiono et al. | 364/405 |

FOREIGN PATENT DOCUMENTS

| | | |
|---|---|---|
| 028127 | 5/1981 | European Pat. Off. . |
| 087143 | 8/1983 | European Pat. Off. . |
| 0116164 | 9/1981 | Japan ................. 364/405 |
| 0069361 | 4/1982 | Japan ................. 364/405 |
| 0024372 | 2/1984 | Japan ................. 364/405 |

OTHER PUBLICATIONS

Science Research Associates, Inc. "Database Processing, Fundamentals, Design, Implementation", 1983; 410-411.

Fred R. McFadden et al., "Database Management", 1985, pp. 348, 372.

Primary Examiner—Jerry Smith
Assistant Examiner—Kim Thanh Tbui
Attorney, Agent, or Firm—Frishauf, Holtz, Goodman & Woodward

[57] ABSTRACT

A data processing system according to the invention comprises a system controller and a plurality of ECRs connected to the system controller. Each ECR has a keyboard for inputting sales data per slip number (kind). The ECR obtains the subtotal per kind of the input sales data. The subtotal is transmitted to the system controller. The controller receives the subtotal data per slip number which is transmitted from the ECR and stores the subtotal data per slip number. When an additional registration is performed, the ECR receives the subtotal data regarding the slip number from the system controller and adds the additionally registered sales data to this subtotal data. The controller stores this newly obtained data as the subtotal data regarding the slip number. When the subtotal data is transmitted to the ECR and the process regarding this subtotal data is being executed in the ECR, the system controller doesn't transmit this subtotal data to the other ECR until the process ends in the ECR.

8 Claims, 20 Drawing Sheets

F I G. 1
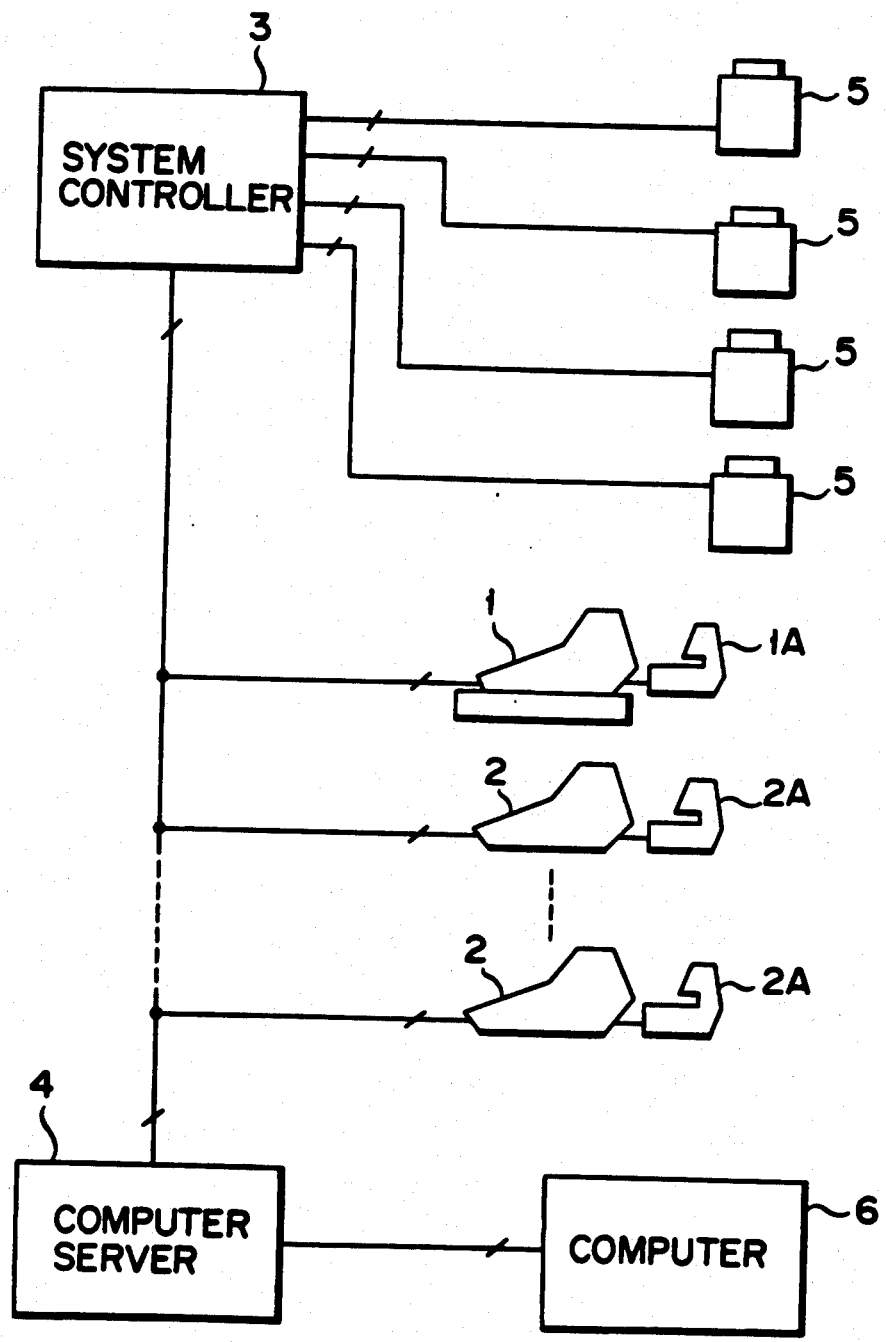

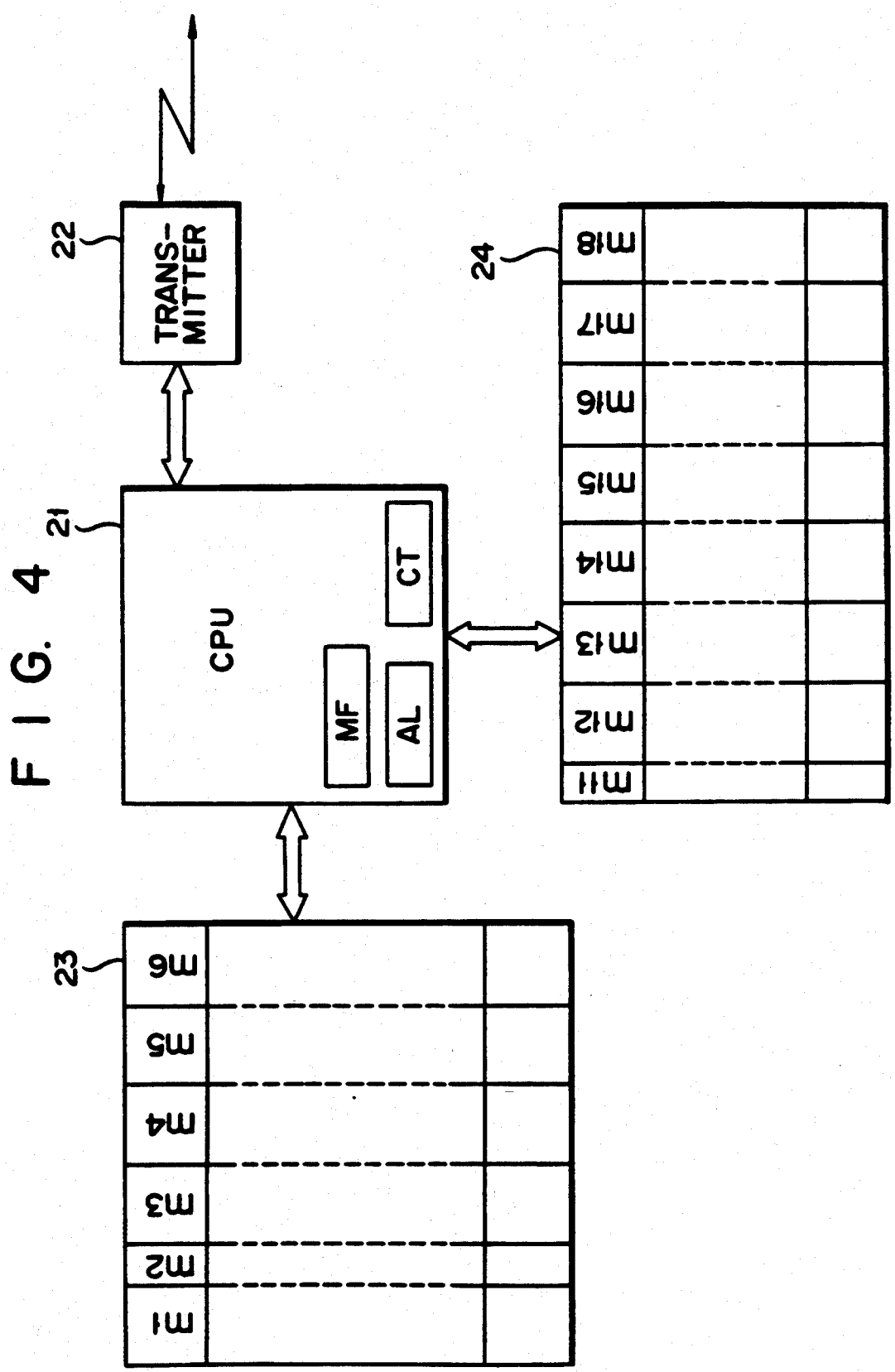

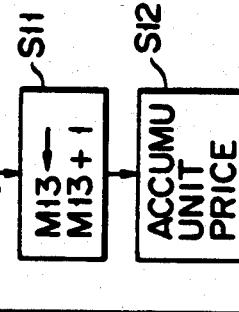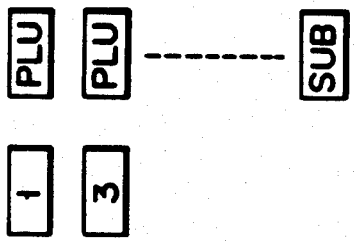
FIG. 5B

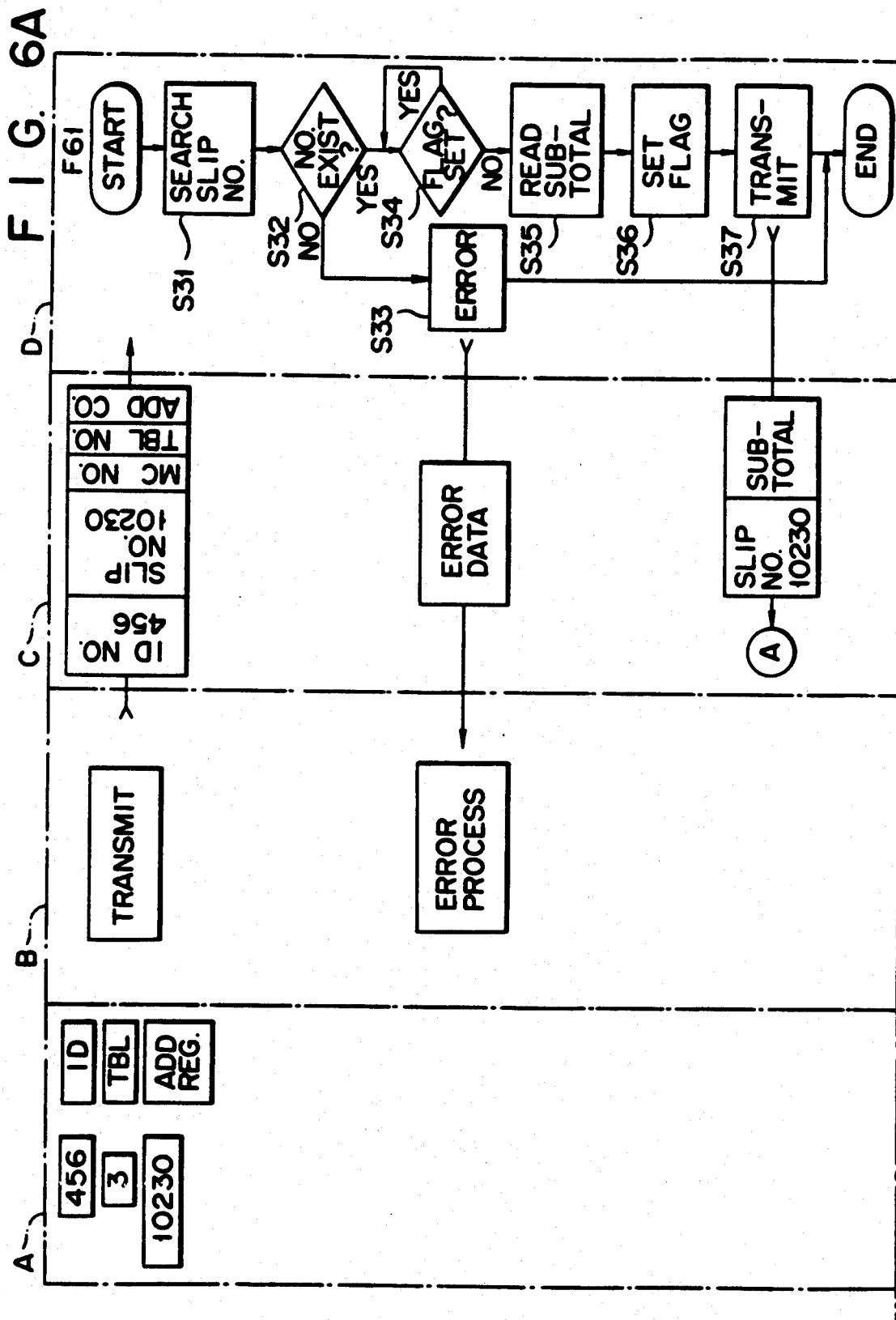

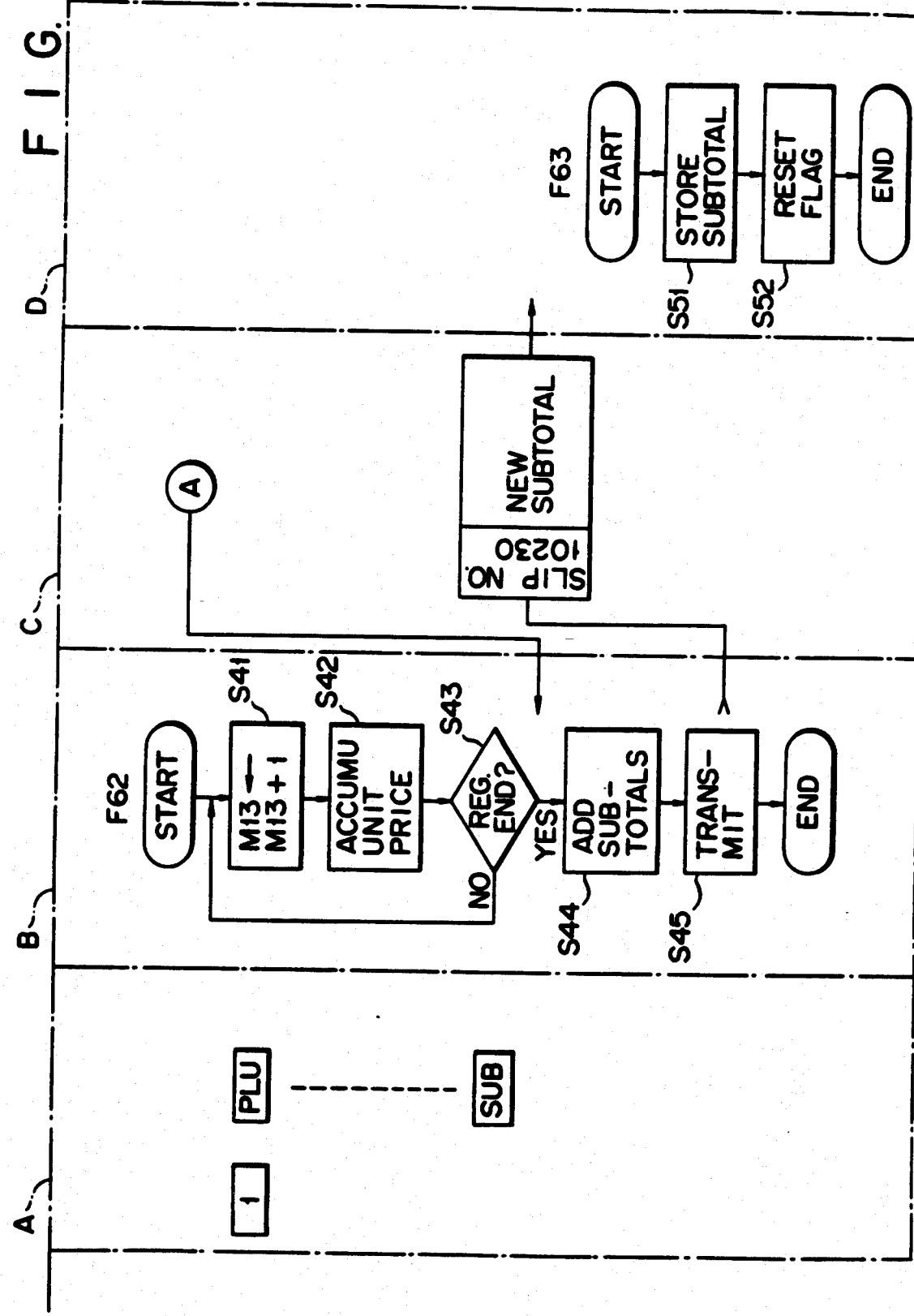

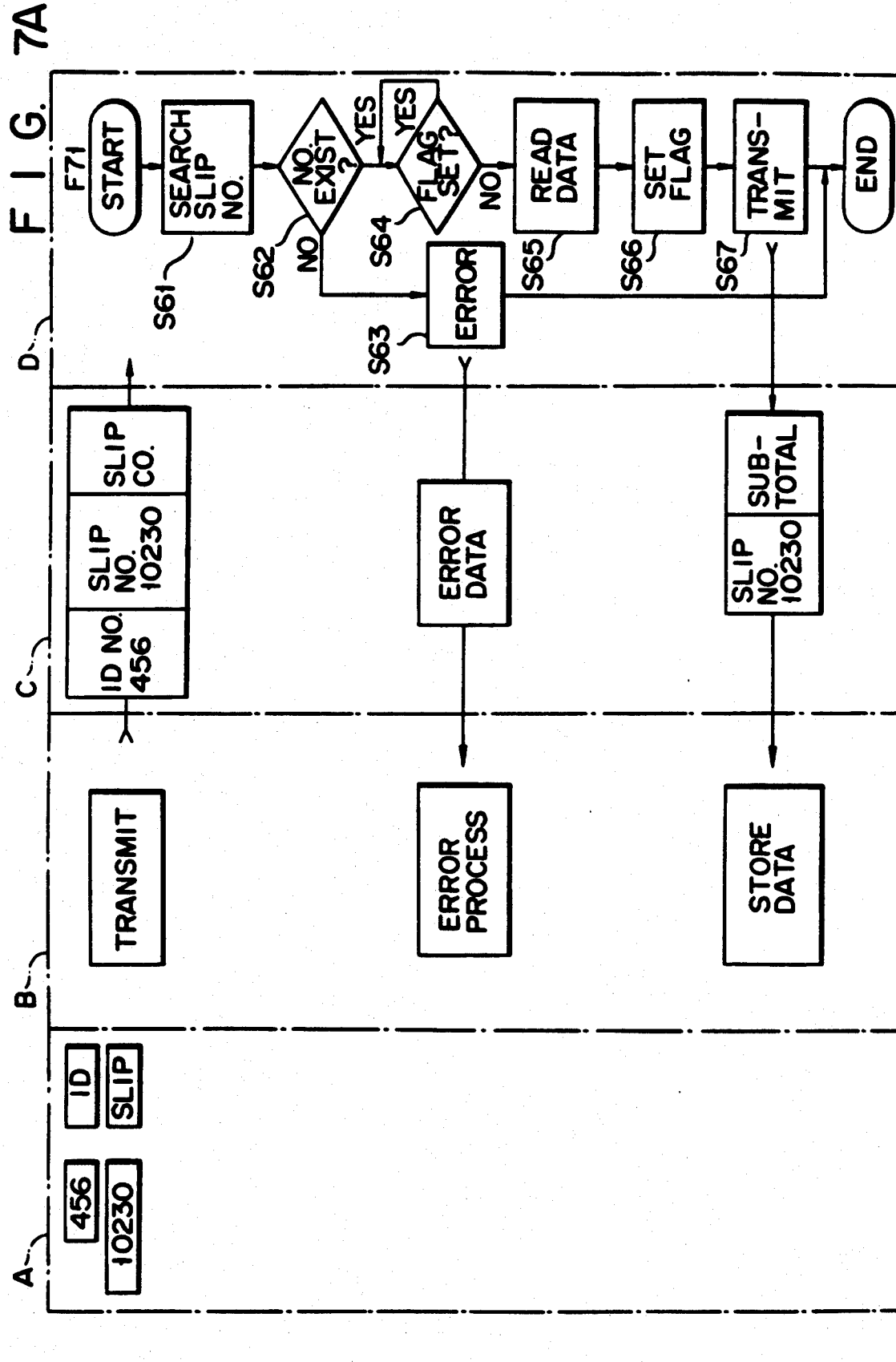

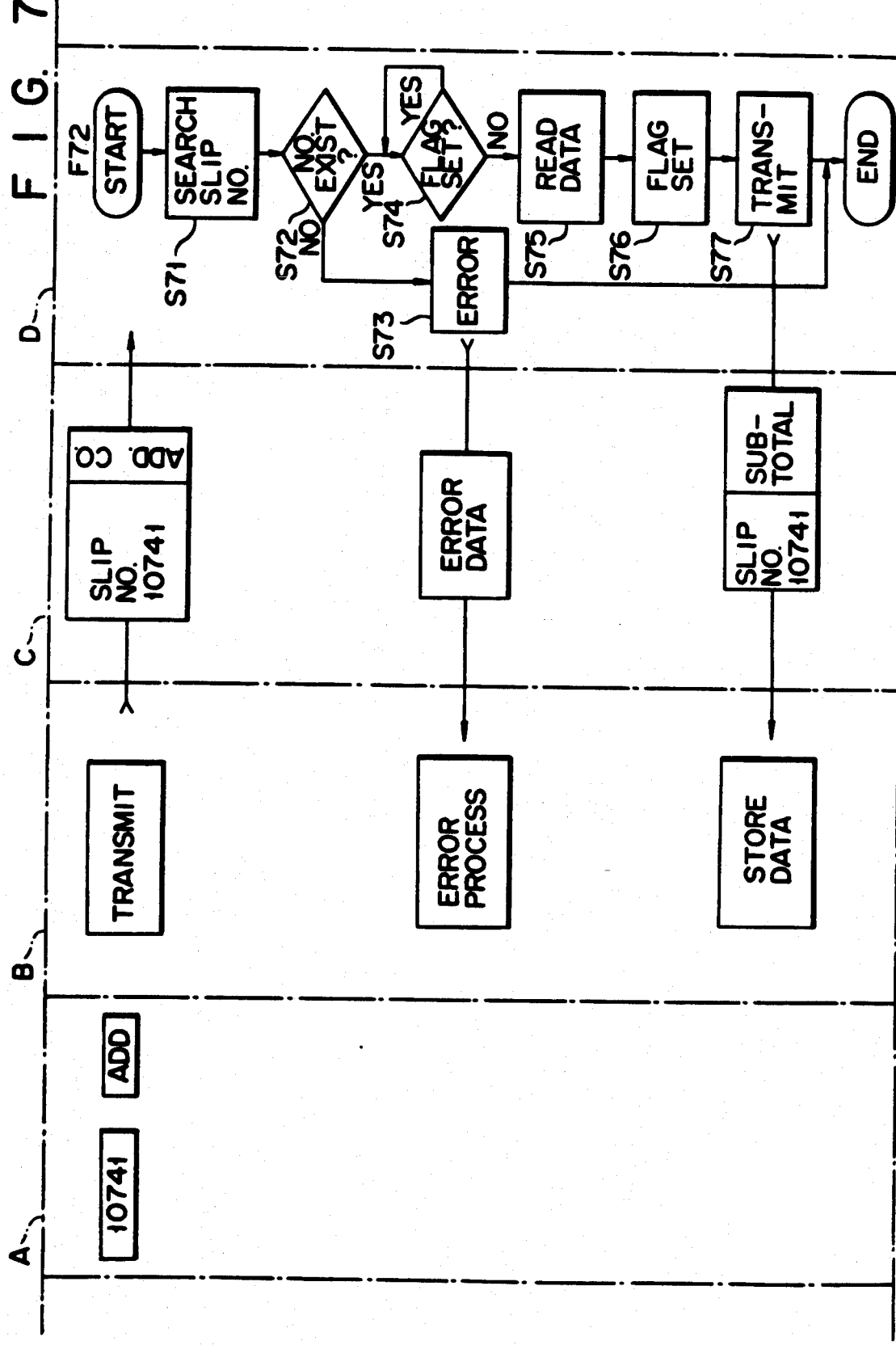

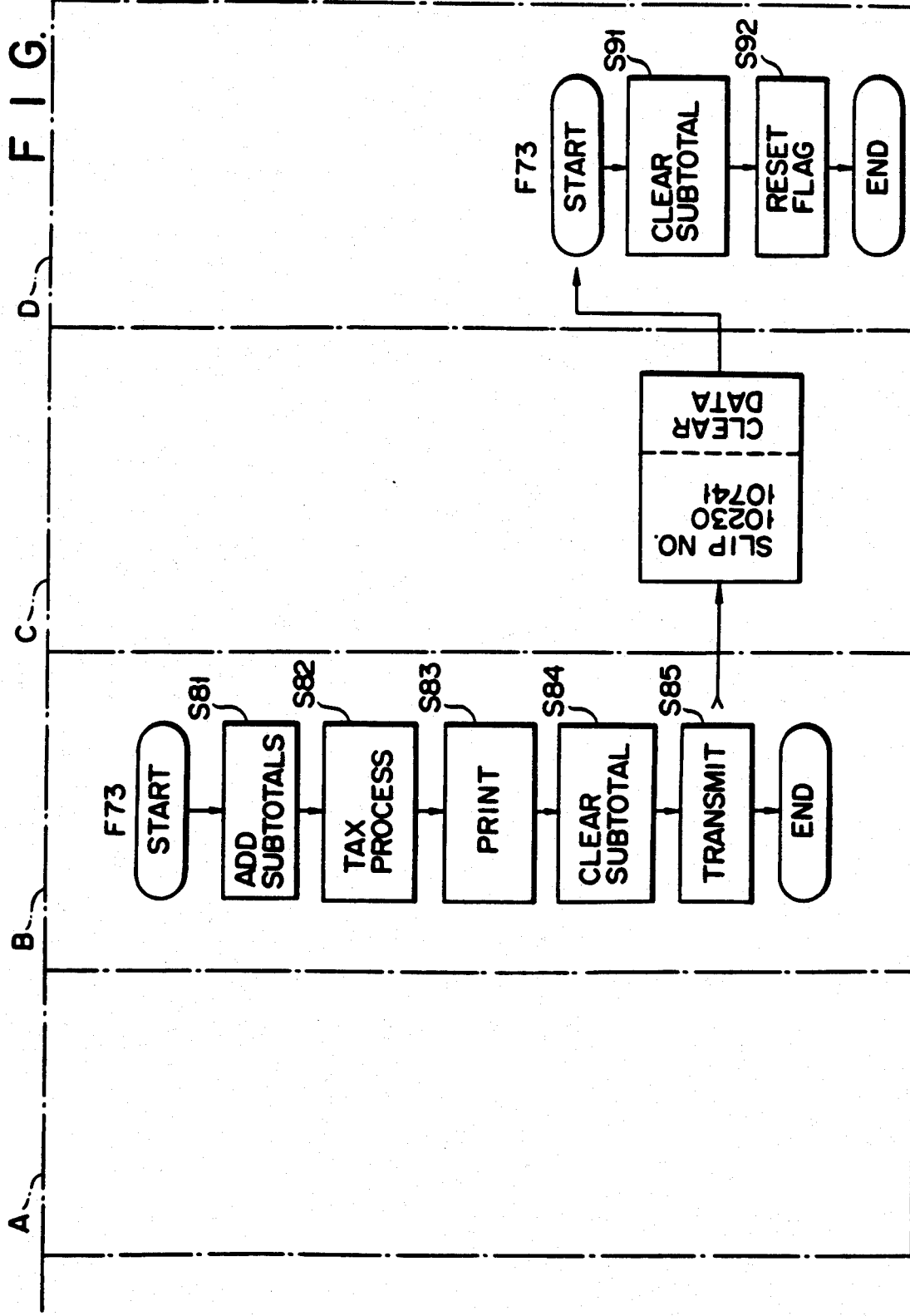

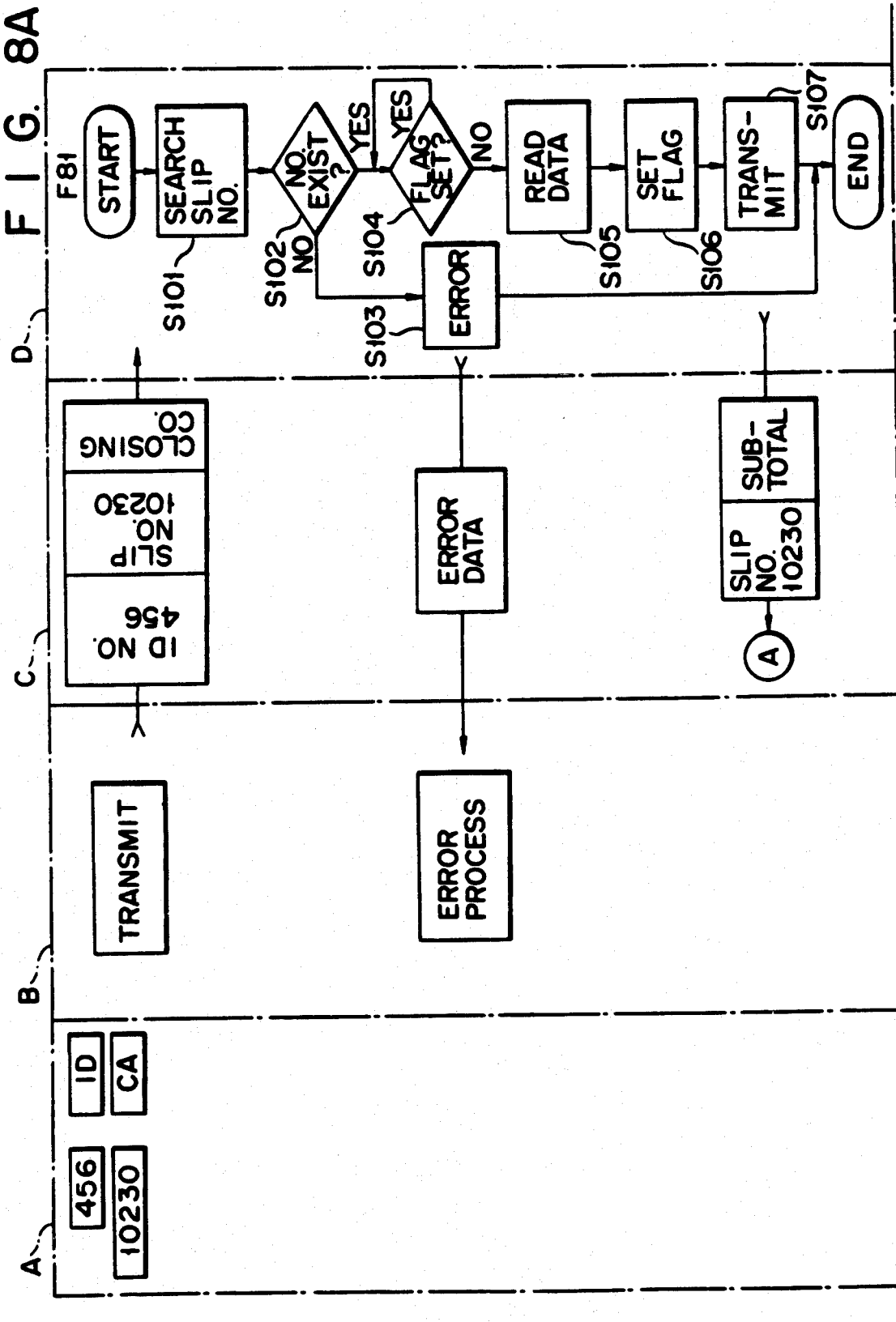

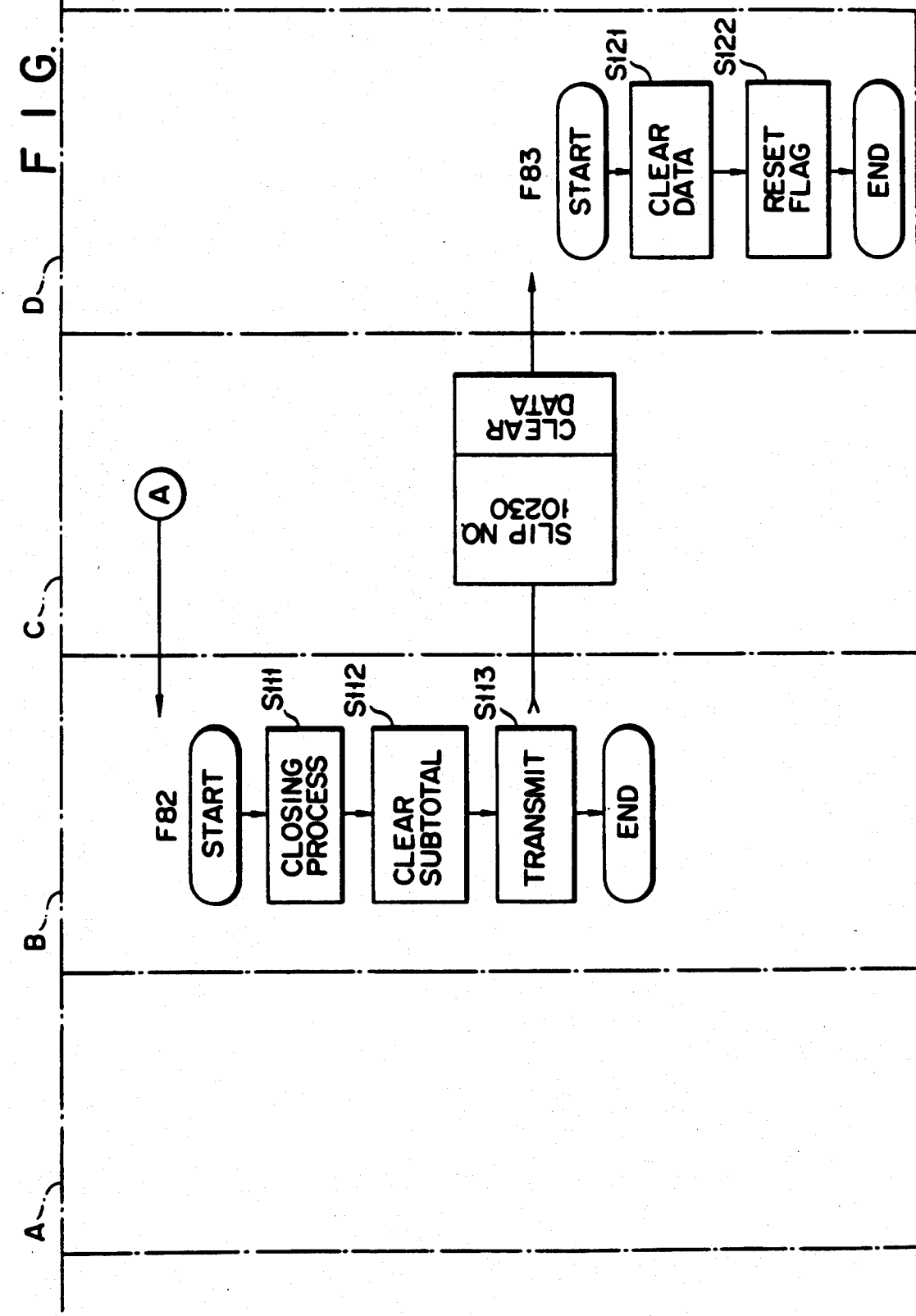

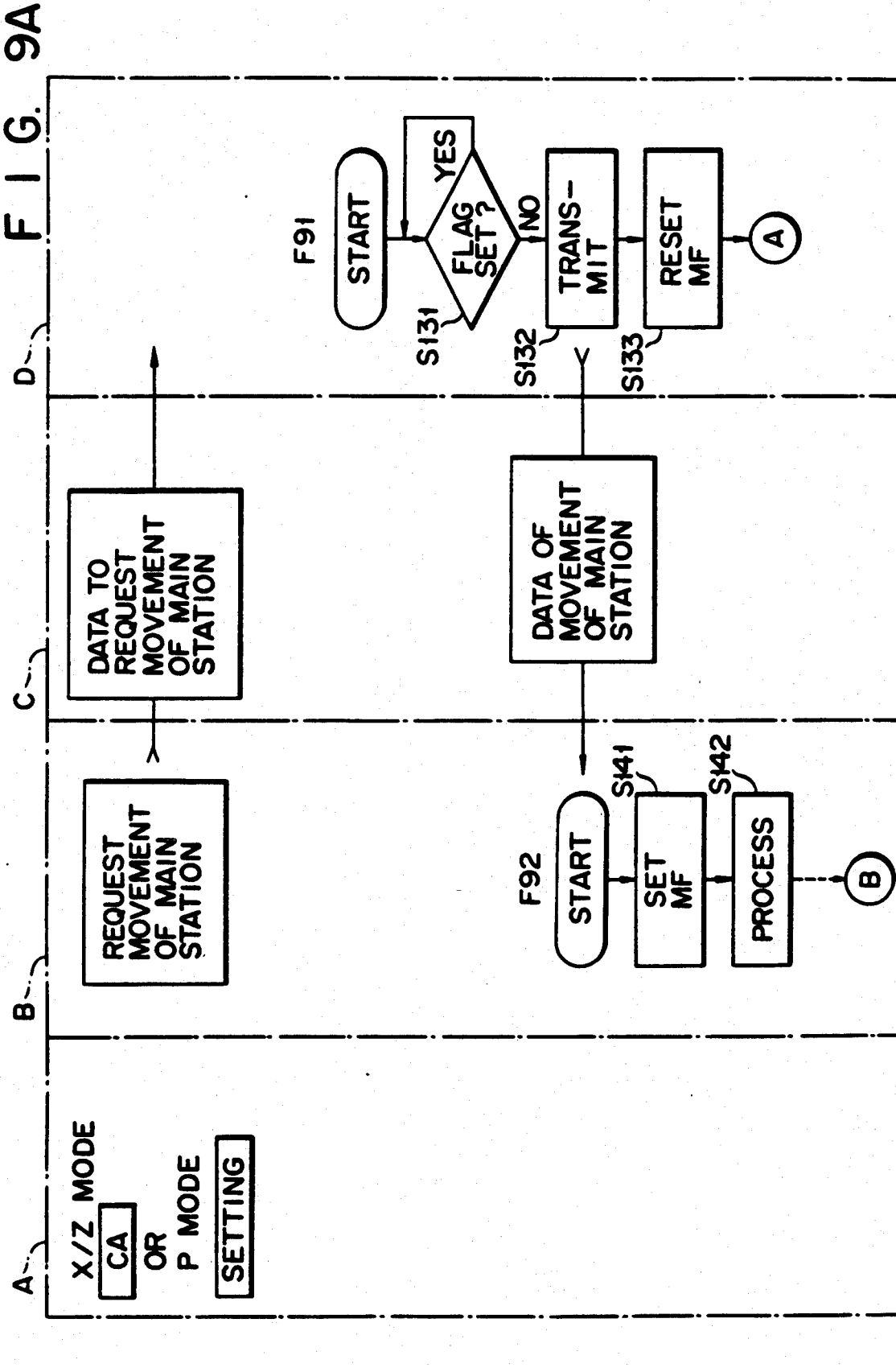

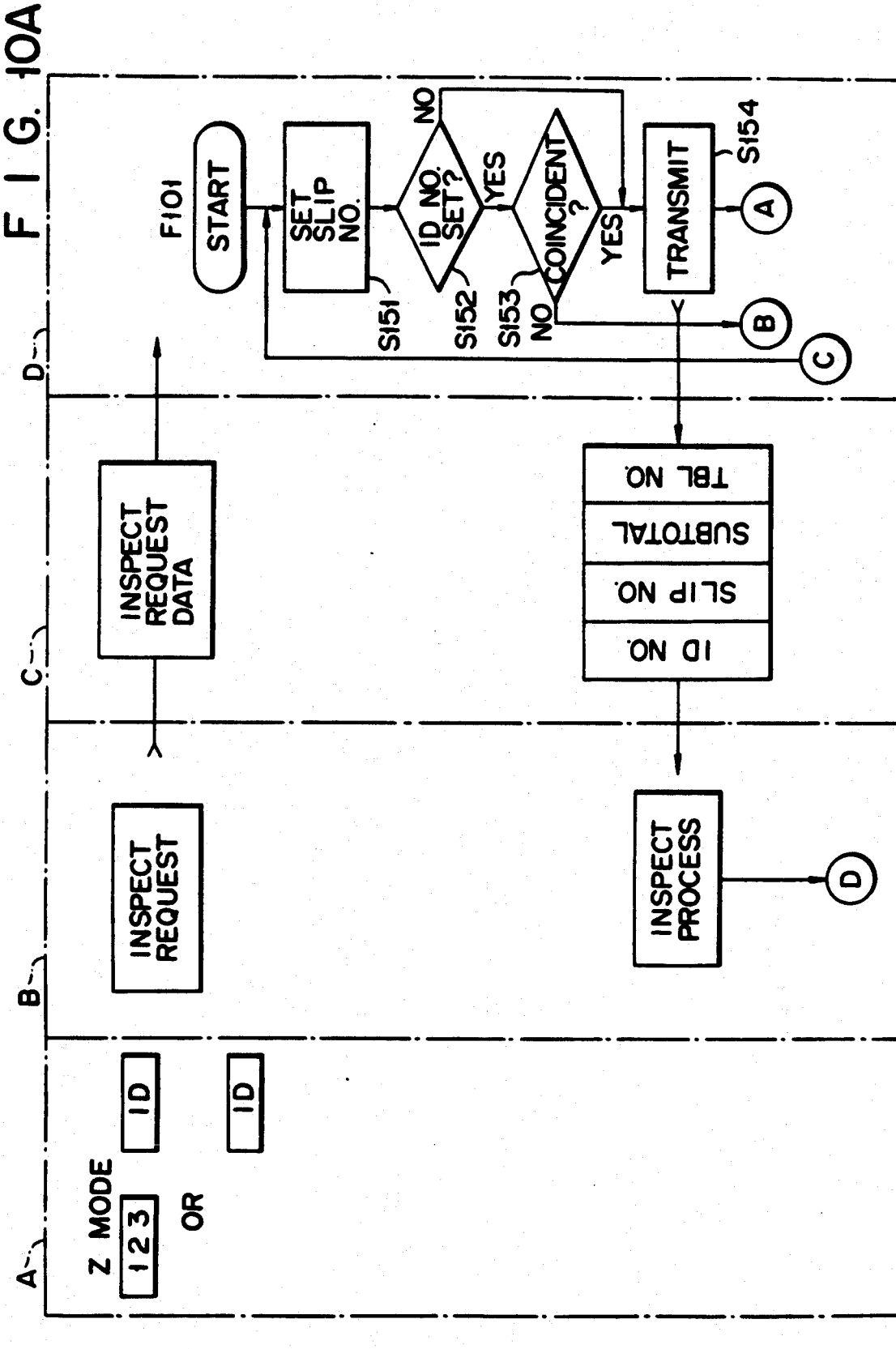

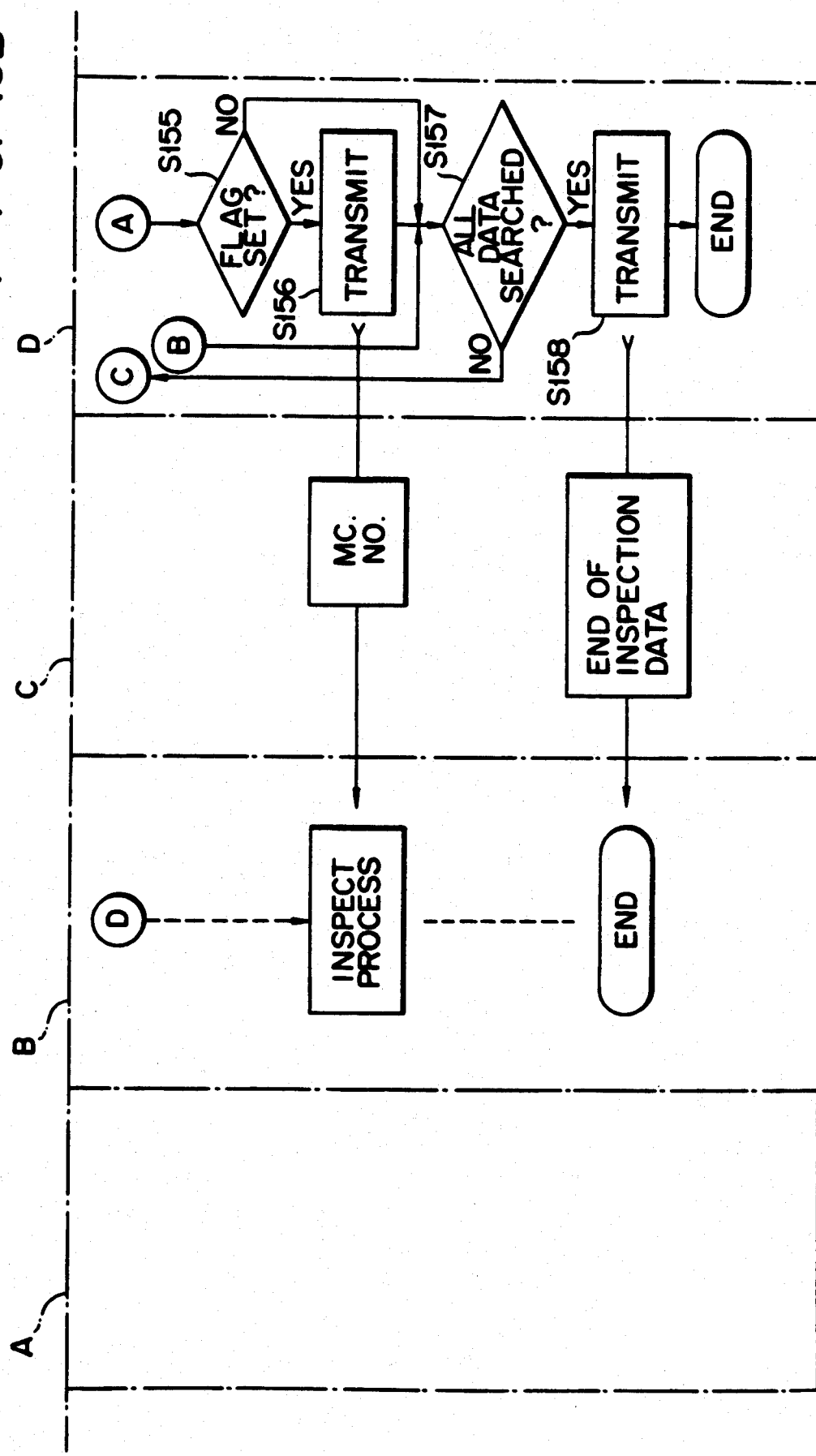

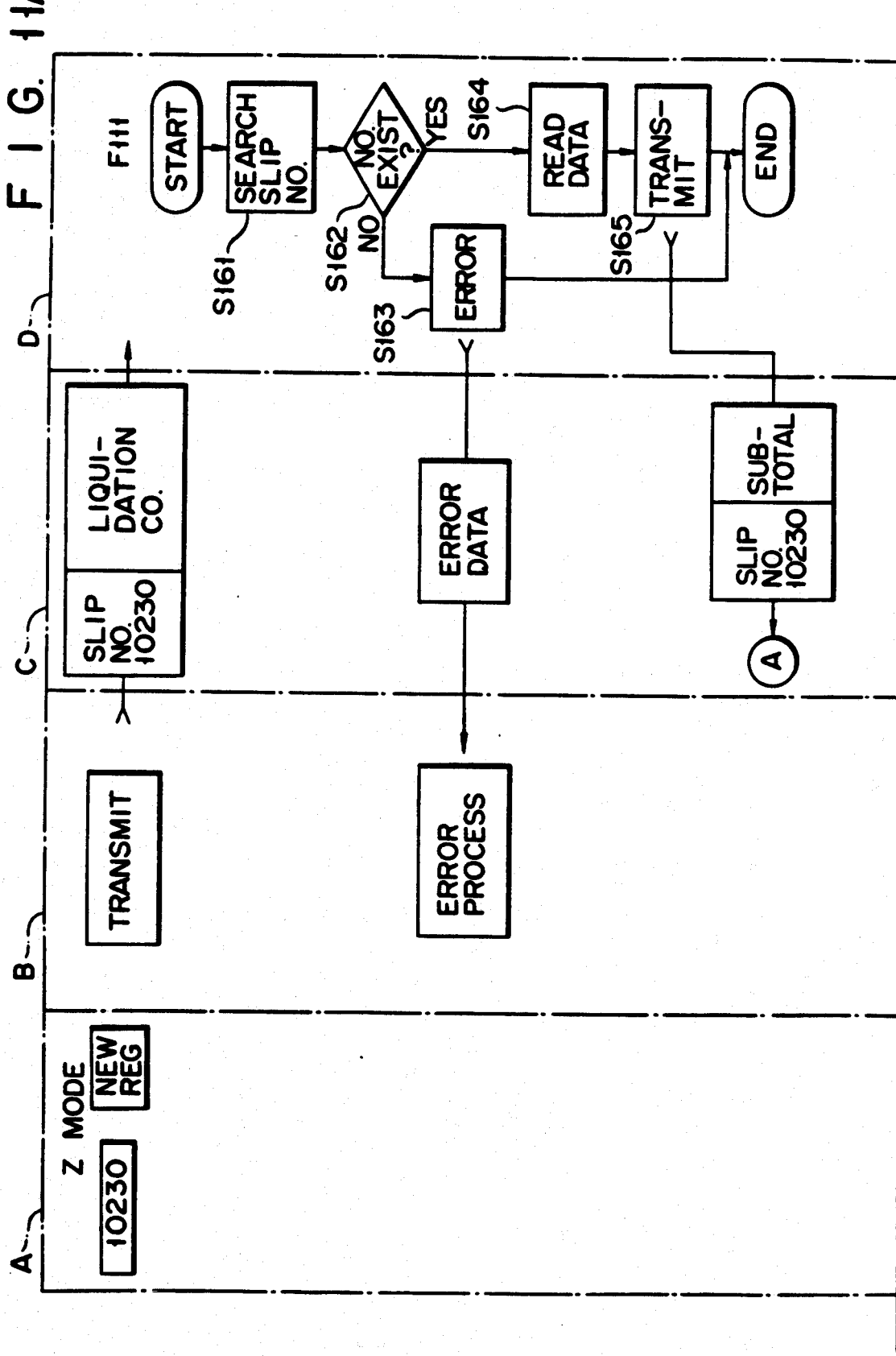

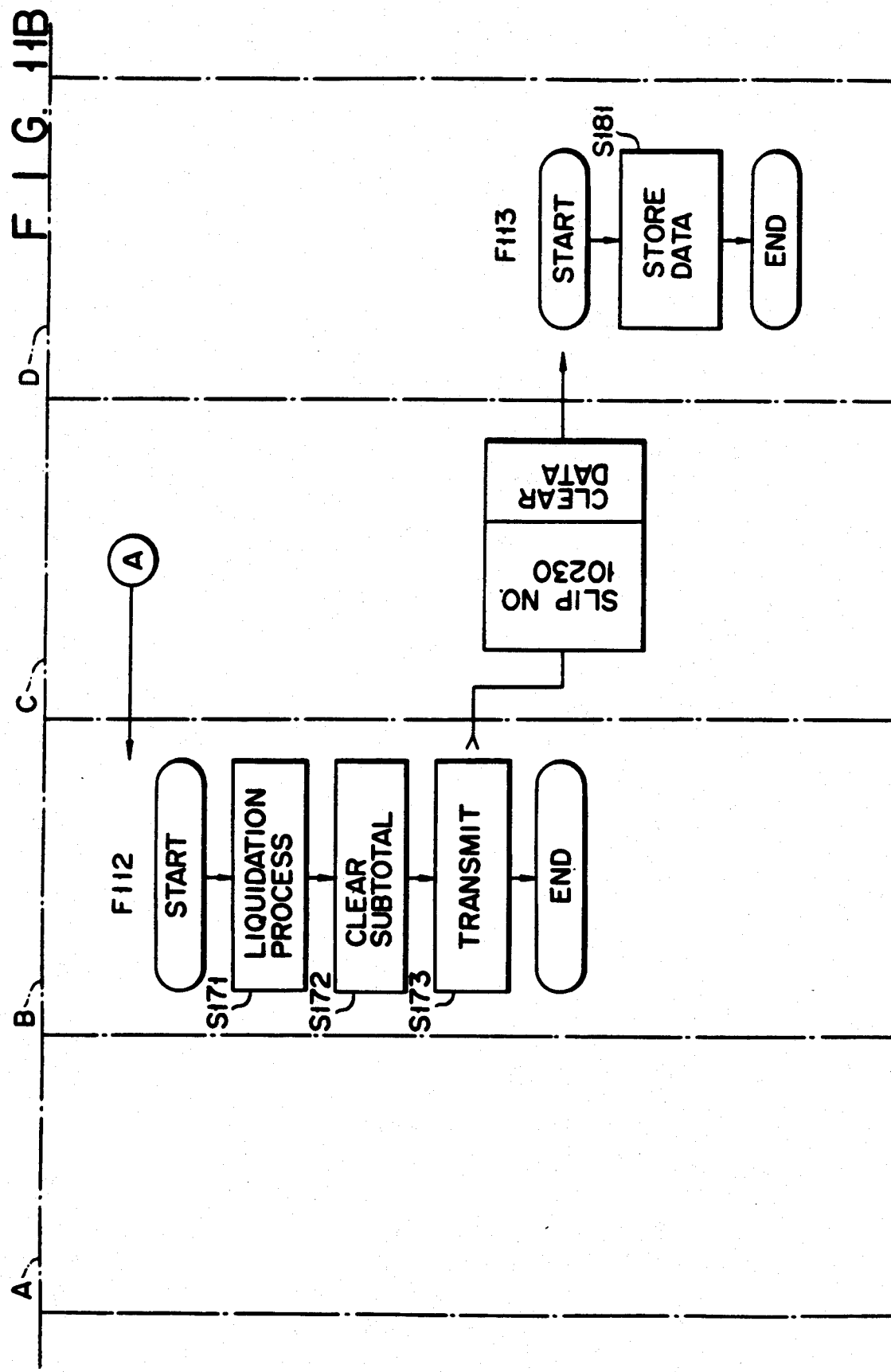

FIG. 12

```
---- YAGI ----
TBLNO 1234
CHKNO 123456
  2  S.JUICE
     BEER

```
TARO
CHK   1234
TBL      2
PB   12345

CHK   1034
TBL     21
PB     300
```

FIG. 13B

```
TARO
CHK   1221
TBL      3
PB     400

JIRŌ
CHK   1225
TBL     16
PB     000
```

FIG. 13C

```
MARY
CHK   1239
TBL      5
PB    3000
MC      03
```

FIG. 14

```
CHK Z    0003
MARY
CHK    104230
TBL         3
PB      12345
```

SYSTEM FOR PROCESSING SALES DATA ON SLIPS USED IN RESTAURANTS

This application is a continuation of application Ser. No. 06/868,636, filed May 29, 1988, now abandoned.

BACKGROUND OF THE INVENTION

The present invention relates to a data processing system for processing sales data, per slip, at restaurants and the like.

As disclosed in Japanese Patent Disclosure (KOKAI) No. 52-67937, a conventional data processing system, as installed for example in restaurants, comprises a plurality of input terminals for inputting data on the food which is ordered, an electronic computer for accumulating the data from the input terminals, a display for displaying the data output by the computer representing the ordered food, and a printer for printing the data which is output, following certain processing, from the computer. The respective input terminals have a printer for printing the data on the ordered goods onto an order slip.

Since, however, the conventional data processing installation is of such a type that all the inputting, processing and display functions are performed by directly utilizing the computer, an electronic computer is required which has a relatively high data processing capacity. Furthermore, it is necessary to perform complex processing operations on the computer. Consequently, an electronic computer must be selected with a processing capacity and capability matching the size of the restaurant. As a result, a standard data processing system may be inadequate for a large-scale restaurant in terms of the required processing capacity, and even one for a small-size restaurant may be too expensive for that kind of business due to the computer requirements which must, nevertheless, be available.

SUMMARY OF THE INVENTION

It is accordingly a main object of the present invention to provide a sales data processing system which can improve data processing efficiency while being usable for restaurants of various sizes.

In order to achieve the aforementioned object a sales data processing system for a restaurant is provided according to the present invention that includes input terminals (1, 2) for inputting data, control apparatus (3) connected to the input terminals and a plurality of output terminals (5) connected to the control apparatus to produce an output data which is input to the input terminal, wherein each of the input terminals (1, 2) includes (a) means (11) for inputting slip identification data and sales data; (b) means (M1 to M6) for storing the sales data, per item, which is input by the input means; (c) evaluating means (12) for transmitting to the control apparatus (3) the slip identification data which is input by the inputting means (11), for receiving the sales data associated with a slip defined by the slip identification data from the control apparatus (3), for operating on the received sales data and sales data input by the inputting means (11), for evaluating new sales data associated with the slip, and for transmitting said evaluated new sales data to the control apparatus (3); and (d) means 1A, 2A) for printing on a slip said new sales data or said sales data input from said inputting means (11); and said control apparatus (3) includes (a) sales data memory means (23) for storing the sales data per slip, and (b) transmit/receive control means (21, 22) for receiving the slip identification data from one of the input terminals (1, 2), for reading, in response to the slip identification data, corresponding sales data from the sales data memory means (23) and transmitting it to the corresponding input terminal, for receiving from said input terminal (1, 2) said evaluated new sales data, and for updating said sales data associated with the slip defined by the slip identification data which is stored sin said sales data memory means (23) to said evaluated new sales data.

In the sales data processing system, sales data per slip is stored in a control apparatus. The accumulating processing of the sales data per item and the storing of the accumulated sales data per item is performed at the respective input terminals. The respective input terminals read sales data from the control apparatus and, after being processed, send a result of the processing to the control apparatus. In this manner, the processing of sales data is performed at the respective input terminals, and sales data per slip are managed in an integrated fashion. The control apparatus, thus, allows the processing to be performed very simply. Although the input terminals require their own sequence of processing operations per item, such processing can be performed at the respective input terminals in a distributed fashion, thus never requiring any large-scale processing capability. The number of input terminals installed can be varied in accordance with the size of the restaurant, whereby it is possible to obtain an optimally-sized sales data processing installation.

BRIEF DESCRIPTION ON THE DRAWINGS

FIG. 1 is a block diagram showing a whole constitution of a sales data processing system according to the first embodiment of the present invention;

FIG. 4 is a block diagram showing a constitution of a system controller;

FIGS. 5A and 5B are diagrams for explaining a new registering operation of the system;

FIGS. 6A and 6B are diagrams for explaining an additional registering operation of the system;

FIGS. 7A to 7C are diagrams for explaining a adding registering operation of the system;

FIGS. 8A and 8B are diagrams for explaining a closing operation of the system;

FIGS. 9A and 9B are diagrams for explaining a liquidating operation and a setting operation of the system;

FIGS. 10A and 10B are diagrams for explaining an inspecting operation of the system;

FIGS. 11A and 11B are diagrams for explaining an individual liquidating operation of the system;

FIG. 12 shows an example of data printed by a kitchen printer;

FIGS. 13A to 13C show examples of printed data on reports which are output due to an inspecting process; and FIG. 14 shows an example of printed data on a report which is output due to an individual liquidating process.

DETAILED DESCRIPTION ON THE INVENTION

A sales data processing system according to an embodiment of the present invention will be described with reference to FIGS. 1 to 13C. This embodiment shows a sales data processing system for use in restaurants. A feature of the invention is that the subtotals of the sales amounts for respective kinds are transmitted among the systems. In this embodiment, the term "kind" assumes the slip number.

FIG. 1 shows a whole constitution of a restaurant system according to an embodiment of the invention. The restaurant system is equipped with one cash ECR 1 and a plurality of server (slave) ECRs 2. Accountants mainly use cash ECR 1. Persons who mainly receive the orders of the customers, for example, waiters and waitresses use server ECRs 2. Cash ECR 1 and server ECRs 2 are equipped with slip printers 1A and 2A to print necessary data on slips. Cash ECR 1 is connected to server ECRs 2. Further, cash ECR 1 and server ECRs 2 are connected to a system controller 3 and a computer server 4. A plurality of kitchen printers 5 are connected to system controller 3. Kitchen printers 5 are installed in the kitchen. Controller 3 operates as a distribution controller of kitchen printers 5. Cash ECR 1 and server ECRs 2 transmit the subtotal data for every slip to controller 3. Controller 3 has a memory to store the received subtotal data for every slip number. Computer server 4 is connected to a personal computer 6. Computer server 4 operates as a distribution controller for cash ECR 1 and server ECRs 2 as terminals. Computer server 4 also operates as an interface between personal computer 6 and controller 3.

Figure 2:
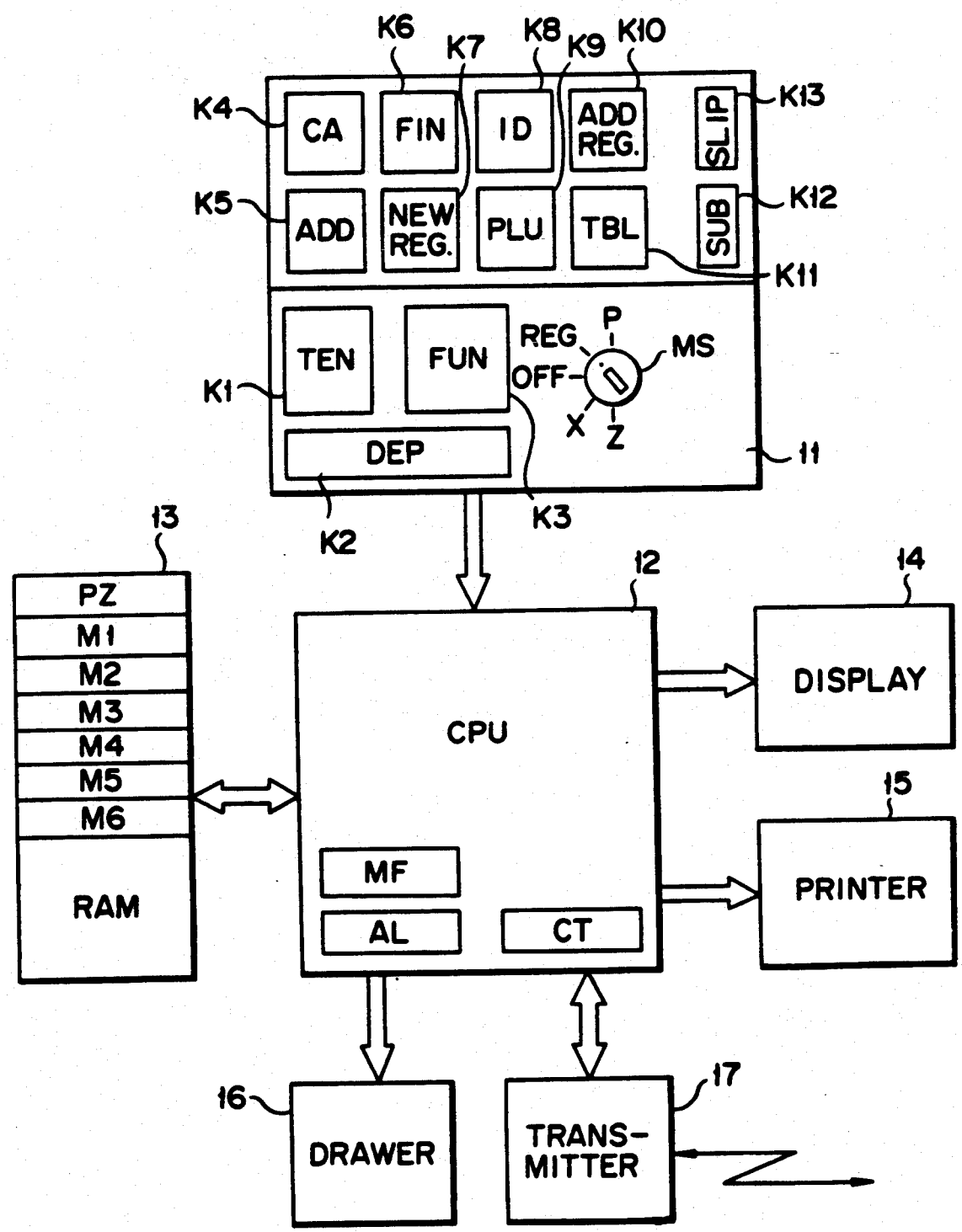
FIG. 2 is a block diagram showing a constitution of a cash ECR.

A constitution of cash ECR 1 will be practically explained with reference to FIG. 2. In FIG. 2, a keyboard of an input section 11 has the following keys: ten-keys K1 to register the sales amounts and the like; a department key K2 to register the data for every department; various kinds of function keys K3; a cash amount key K4; an addition key K5 to add the sales amounts of a plurality of slips; a finalize key K6; a new registration key K7; a personal identification number input key K8; a PLU key K9 to perform the PLU (price look up) registration; an additional order registration key K10; a table number input key K11; a subtotal key K12; and a slip number input key K13. The keyboard has a mode switch MS to designate the respective modes of the setting (P), registration (REG), power supply (OFF), inspection (X), and liquidation (Z). Input section 11 outputs a key input signal in response to the key operation. Input section 11 outputs a mode designation signal in response to the change-over of mode switch MS. These signals are supplied to a CPU (central processing unit) 12.

CPU 12 has various kinds of registers (not shown), a main station flag register MF, an arithmetic operating section AL, and a control section CT. CPU 12 executes input process, registering process, printing process, display process, data transmitting process, and the like in accordance with microinstructions which are stored in a ROM and the like (not shown). CPU 12 transmits and receives data to and from a RAM 13 and accumulates the sales data per time zone and also accumulates the sales total data per responsible person. CPU 12 sends display data to a display 14 and print data to a printer 15. CPU 12 also controls the opening of a drawer 16 and transmits and receives data to and from a transmitter 17. Transmitter 17 is connected to transmitters of external apparatuses through a bus or the like and transmits and receives data thereto and therefrom.

RAM 13 has a time zone total memory M1, a person total memory M2, a tax total memory M3, a gross sales total memory M4, a void total memory M5 and an extra/ discount total memory M6. Memory M1 for the total per time zone stores the sales data accumulated per time zone. Memory M2 for the total per responsible person stores the sales data accumulated per responsible person. Tax total memory M3 stores the sum of tax amounts. Gross total memory M4 stores the whole total of the sales data. Void total memory M5 stores the total of the corrected amounts. Extra/discount total memory M6 stores the total of extra and discount amounts. RAM 13 has individual liquidation amount memory PZ. Individual liquidation amount memory PZ is provided to cope with the case where the customer left the restaurant without paying. If such a situation occurs, the liquidation is individually performed and memory PZ stores the liquidation amount.

Figure 3:
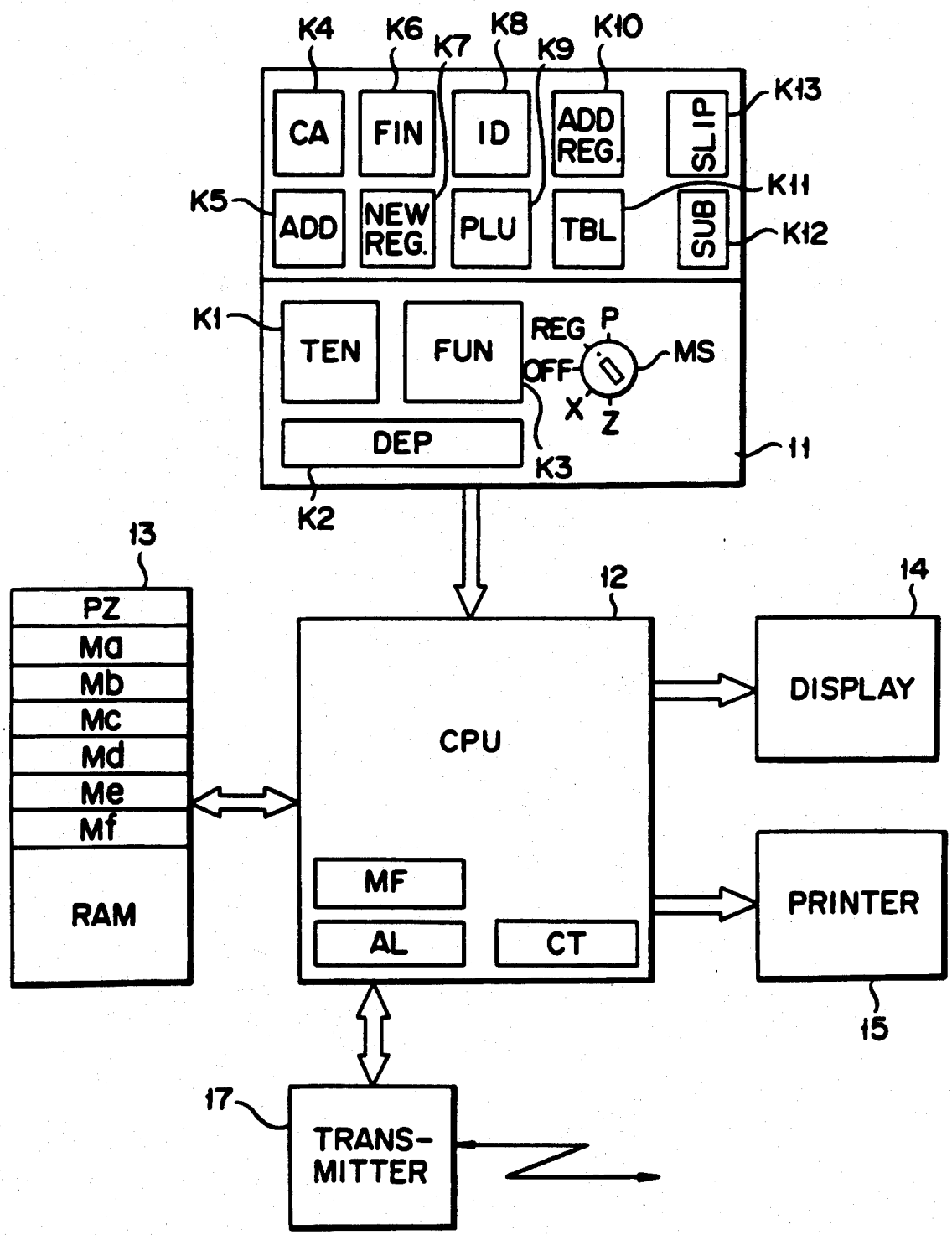
FIG. 3 is a block diagram showing a structure of a server ECR.

FIG. 3 shows a practical constitution of server ECR 2. Server ECR 2 is fundamentally constituted similarly to cash ECR 1 and differs from cash ECR 1 with respect to the point such that server ECR 2 doesn't have any drawer, or the like. Therefore, in FIG. 3, the same parts and components as those shown in FIG. 2 are designated by the same reference numerals and their descriptions are omitted. In server ECR 2, RAM 13 has a memory MA to store the total number of sold articles per department, a memory MB to store the total number of sold articles per PLU, a memory MC to store the sum of amounts of sold articles per group, and a memory MD to store the sum of amounts of sold articles per person in charge.

FIG. 4 shows a constitution of system controller 3. System controller 3 has a CPU 21. CPU 21 has an arithmetic operating section and a control section. CPU 21 transmits and receives data to and from ECRs as respective terminals through a transmitter 22. CPU 21 transmits and receives data to and from a memory 23 for every slip to store the subtotal data per slip and the like. Memory 23 for every slip has a lending flag memory m1, a machine number memory m2, a slip number memory m3, a memory m4 for storing the number of the person in charge of the server, a table number memory m5, a table number memory m5, and a subtotal memory m6. When lending requests for the same slip are issued from a plurality of ECRs (in the case where additional orders are simultaneously inputted from a plurality of ECRs for the same slip, or the like, namely, when the operation such as to change the subtotals is performed with respect to the slip), lending flag memory m1 stores a lending flag to allow the process by the other terminal to be waited until the lending to one terminal completes (i.e., until the process by one terminal is finished). CPU 21 transmits and receives data to and from a buffer 24 to transfer the data to the kitchen printers. Buffer 24 stores the data which is distributed to each kitchen printer 5. Buffer 24 has a memory m11 to store the kitchen printer numbers, a memory m12 to store the number of sold articles, a memory m14 to store characters, a memory m15 to store the table numbers, a memory m16 to store the slip numbers, a memory m17 to store the time, and a memory m18 to store the machine numbers.

Figure 5A:
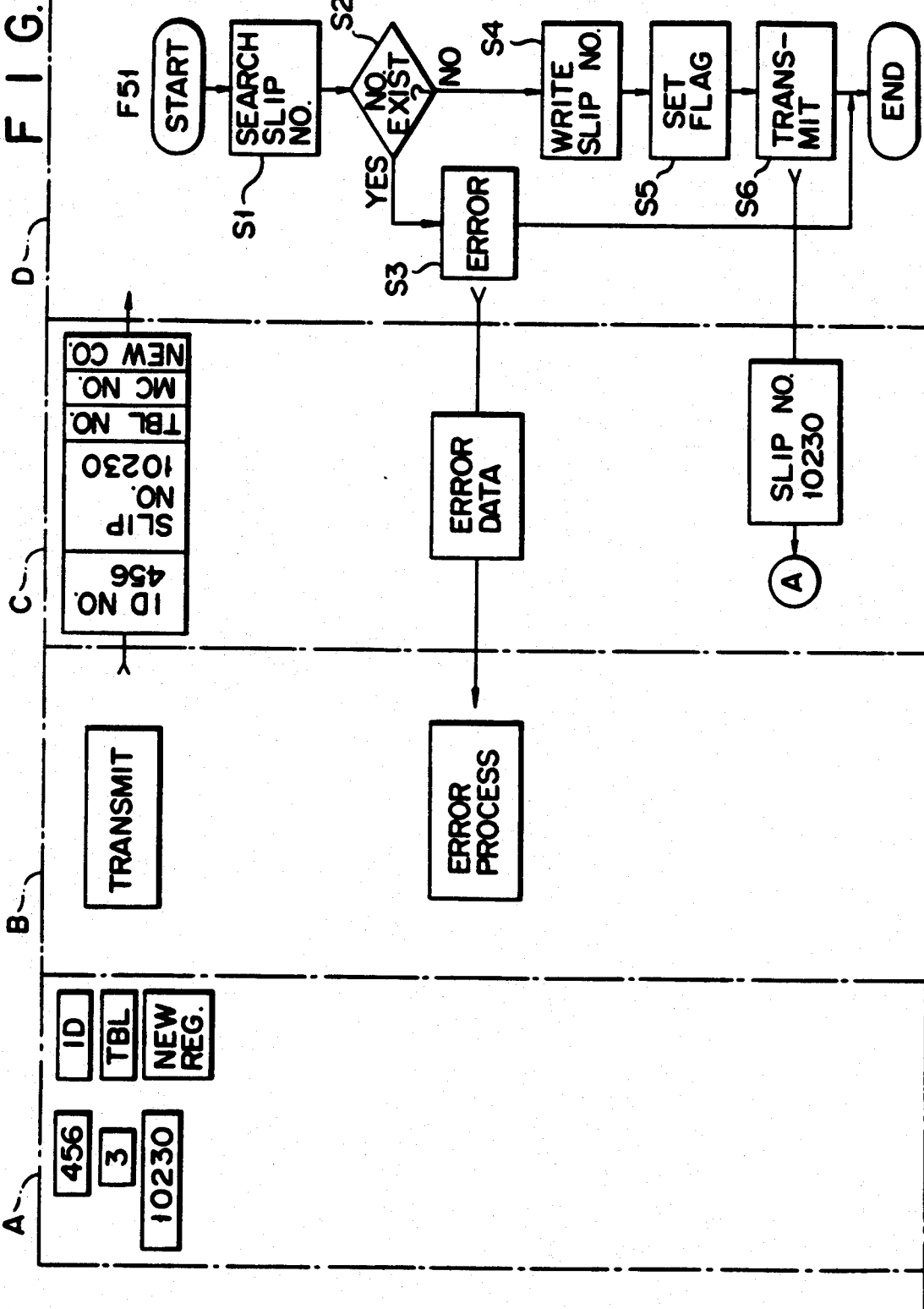
Figure 9B:
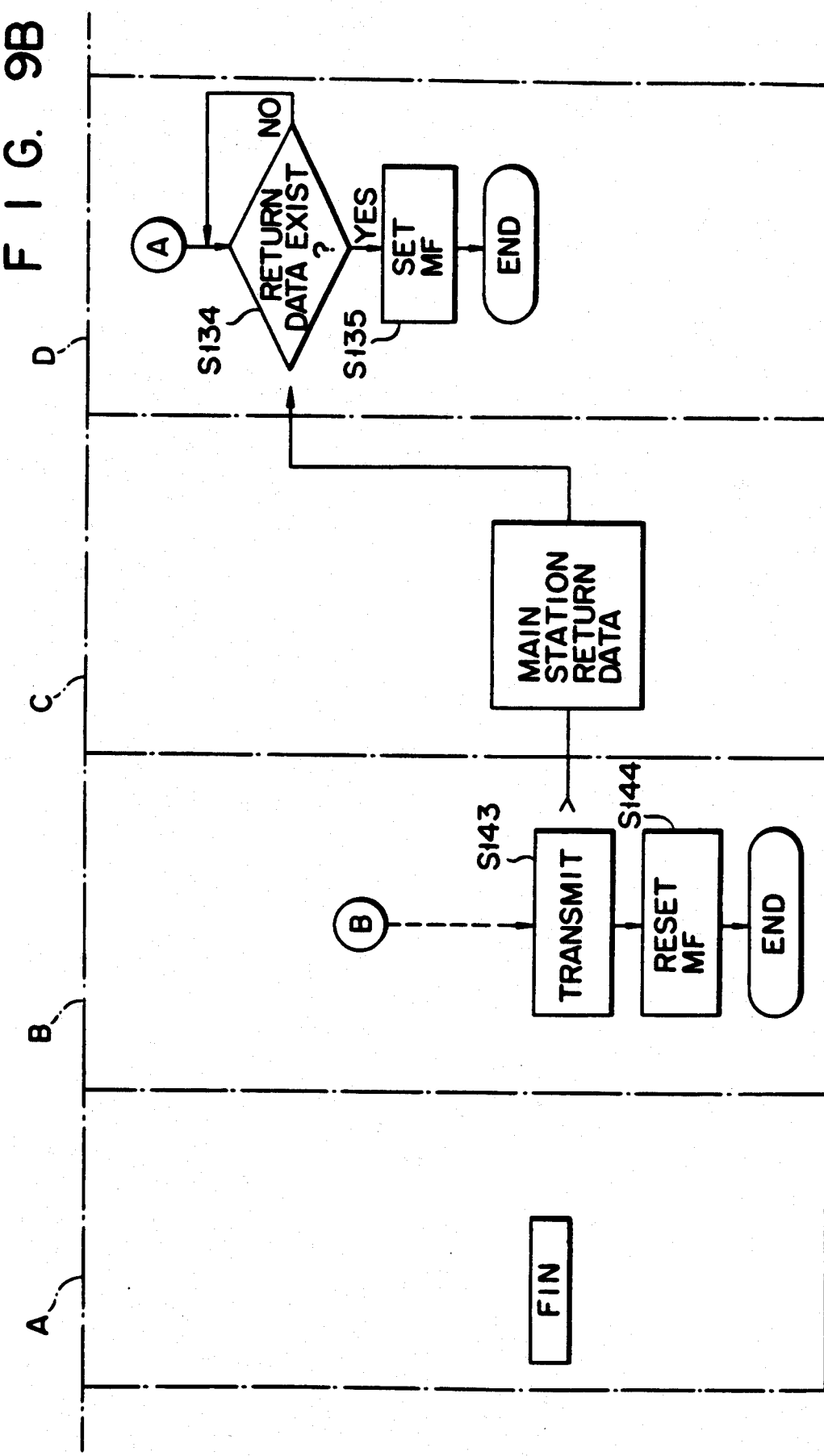

The operation of the sales data processing system shown in FIG. 1 will then be described with reference to FIGS. 5 to 11. FIGS. 5 to 11 are timing charts also serving as flowcharts in consideration of the time relation and arrangement in order to describe the key operations which are executed by terminals, processing operations of the terminals, formats of transmission data, processing operation of system controller 3, and relation thereamong. In FIGS. 5 to 11, section A surrounded by a broken line shows an example of the key operations which are executed by the terminals. Section B shows the processing operations of the terminals. Section C shows the formats of the data which is transmitted from the terminals to system controller 3. Section D shows a processing operation of controller 3. FIGS. 5A and 5B show the new registering operation. FIGS. 6A and 6B show the additional registering operation. FIGS. 7A and 7C show adding registering operation. FIGS. 8A and 8B show the closing registering operation. FIGS. 9A and 9B show the main station moving processing operation. FIGS. 10A and 10B show the subtotal inspecting processing operation. FIGS. 11A and 11B show the individual liquidating processing operation.

(1) New registering operation

The new registering operation will now be described with reference to FIGS. 5A and 5B. The new registration denotes that a slip is newly issued at the request of the customer. In this embodiment, it is assumed that the customer of the table number 3 orders the articles of the PLU codes 1, 3, — and the operator having the personal identification number 456 resist these PLU codes on the slip of the number 10230. The new registration is mainly carried out in server ECRs 2.

As shown in section A in FIGS. 5A and 5B, the operator registers the personal ID number 456 which is peculiar to the operator himself by ten-keys K1 and operates personal identification number input key K8. Next, the operator registers the table number 3 by ten-keys K1 and operates table number key K11. The operator registers the slip number 10230 by ten-keys K1 and operates new registration key K7. In response to the operation of key K7, ECR 2 outputs the input data to system controller 3. The data which is sent from ECR 2 to system controller 3 is constituted by the number of the person in charge, slip number, table number, machine number of the terminal (ECR 2), and new registration code data as shown in section C in FIG. 5A.

System controller 3 receives the transfer data from the terminal and starts flowchart F51 shown in section D in FIG. 5A. Control searches the content stored in memory m3 on the basis of the received slip number (step S1). Since the operating mode is the new registration, if the relevant slip number has already been stored in memory m3, this case results in the overlap registration, so that an error occurs (steps S2 and S3). Unless the relevant slip number is registered, the control advances to step S4. Control writes the machine number into memory m2 of the idle page in memory 23 for every slip, the slip number into memory m3, the number of the person in charge into memory m4, and the table number into memory m5 (step S4). Control sets the lending flag into the relevant page of memory m1 in memory 23 (step S5) and sends the slip number to the relevant terminal (step S6). If the error data is sent to the terminal as the result of step S3, the terminal executes the error process.

On the other hand, the key operation to input the PLU codes 1, 3, — is carried out subsequent to the above key operations. This key operation is performed as shown in section A in FIG. 5B. Namely, the operator registers "1" by ten-keys K1 and then operates PLU key K9 and thereafter, the operator sequentially executes the key operations. Lastly, the operator operates subtotal key K12. The terminal responds to this key operation and executes flowchart F52 shown in section B in FIG. 5B. Each time an article is registered, the terminal updates the number of sold articles per PLU or the number of sold articles per department, or the like stored in memory 13 (step S11). Next, the unit prices of the articles registered in the subtotal amount (initial amount is "0") are accumulated (step S12). Control discriminates whether the subtotal key indicative of the end of registration has been operated or not (step S13). Until the registering operation ends (i.e., until subtotal key K12 is operated), control repeats the operations of steps S11 to S13 each time PLU key K9 is operated. Due to this, the numbers of sold articles per PLU, per department, and the like are obtained and at the same time, the subtotals of the sales amounts regarding this slip are derived.

When the slip number is transmitted from system controller 3 during execution of flowchart F52, the terminal determines that the preparation of the new registration in controller 3 has been completed. The terminal sends the data derived in flowchart F52 to system controller 3. This data consists of the slip number and the subtotal data of the new registration. When system controller 3 receives this data, it executes the processes of flowchart F53 shown in section D in FIG. 5. Namely, control writes the subtotal data into the page corresponding to the slip number (10230) in memory m6 in slip memory 23 (step S21). Next, the lending flag corresponding to this slip number in memory m1 is reset (step S22).

The slip number and subtotals and the like are stored into slip memory 23 of system controller 3. (2) Additional registering operation The additional registering operation will then be described with reference to FIGS. 6A and 6B. The additional registering operation denotes that in the case where the additional order is requested with regard to the slip which has already been issued, new data is added to the content of this slip. The additional registration may be also carried out by the terminal by which the new registration has been executed or may be also performed by other terminal. In the additional registration, different from the new registration, additional order registration key K10 is operated in place of new registration key K7. When the data is sent to system controller 3 in accordance with the key operations mentioned above, controller 3 starts the processes of flowchart F61 shown in section D of FIG. 6A. First, memory m3 in memory 23 is searched to find out the relevant slip number. The relevant slip number must have already been registered since this order is additional. Therefore, if this slip number doesn't exist in memory m3, an error will occur and predetermined error processes are executed (steps S31, S32, S33). When the slip number (10230) is detected, the lending flag corresponding to this slip number is checked to see if it has been set (steps S33 and S34). If the lending flag has been set, control waits until the lending (i.e., the processes regarding this slip in the other ECRs) ends. This is because the accurate subtotal is not obtained if the subtotals are simultaneously updated by two terminals. After completion of the lending, the subtotal data corresponding to the slip number is read out of slip memory 23 (step S35). The corresponding lending flag is set (step S36). Control transfers the slip number and subtotal data to the terminals from which the additional registration was requested (step S37). When the terminal receives this data, the terminal decides that the preparation for the additional registration has been completed in controller 3. Then, the terminal sends the data obtained due to the processes of flowchart F62 (which will be explained hereinafter) in FIG. 6B to system controller 3.

On the other hand, when the additional orders are requested (it is assumed in this example that the 5 articles of the PLU codes 1, — are inputted), the terminal starts the processes of flowchart F62 shown in section B in FIG. 6B. Flowchart F62 (steps S41 to S44) is substantially the same as flowchart F52 (steps S11 to S14) shown in the new registration. Namely, controller 3 adds the number of additionally ordered articles per PLU or department to the data stored in RAM 13 (step S41). Control accumulates the unit prices of the articles registered due to the additional registration to the subtotal (initial value is "0") (step S42). The controller discriminates whether the additional registration has been finished or not (step S43). The above operations are repeated until the additional registration ends. Thus, the subtotal of the amount of sold articles which were additionally registered is derived. When the subtotal key is operated, control determines that the additional registering operation has been finished. Next, the calculated subtotal is added to the transmitted subtotal (step S44). Due to this, the new subtotal of the amounts of sold articles regarding the slip is obtained. The new subtotal data is transmitted together with the slip number to system controller 3 (step S45). Upon reception of this data, control starts the processes of flowchart F63 shown in section D of FIG. 6B. The control stores the new subtotal data transmitted into memory m6 (step S51). Next, the lending flag corresponding to the slip number is reset (step S52). In this manner, the subtotal data per slip stored in slip memory 23 of system controller 3 is read out from any terminal each time the additional registration is executed, then this data is updated and stored.

When the subtotal key is lastly operated after the new registration and additional registration were performed, the article data registered, the number of articles, and the like are transmitted to system controller 3 (not shown). The order data is written into kitchen printer transferring buffer 24. The data written into buffer 24 is read out under control of CPU 21 and sent to kitchen printer 5 corresponding to the article and printed. FIG. 12 shows an example of data printed by kitchen printer 5, in which the name in charge (YAGI), table number (1234), machine number (03), article names (JUICE, BEER), number (no number is printed in the case of JUICE because it is 1; 2 is printed in the case of BEER), and time (12:45) are printed.

(3) Adding registering operation

The adding registering operation denotes that the sum of sales amounts of two or more slips is obtained. In the case where one customer pays for two or more slips together, the operator carries out the addition registering operation to obtain the sum of sales amounts of two or more slips. This addition registering operation will then be described with reference to FIGS. 7A to 7C. FIG. 7A shows an example of the key operations when the person in charge having the personal identification number 456 adds the amounts of slips of the numbers 10230 and 10741. In such an adding registering process, addition key K5 functions as a closing key.

First, the key operation regarding the first slip is executed. Namely, the ID number (456) is registered by ten-keys K1. Personal identification number key K8 is operated. The slip number 10230 is registered by ten-keys K1. Slip number key K13 is operated. The data corresponding to the key operations (i.e., the data indicative of the person in charge, slip number, slip code data) is transferred and the processes of flowchart F71 shown in section D in FIG. 7A are started. In this flowchart F71, the processes similar to those in steps S31 to S37 in flowchart F61 in the additional registering operation are executed. Namely, a check is first made to see if an error is detected or not (steps S61 to S63). Next, a check is made to see if the lending flag has been set or not. The subtotal data regarding the input slip number is read out of memory m6 (step S65). The control sets the corresponding lending flag and transmits the read subtotal data together with the slip number to the terminal from which the adding process was requested (step S67). The transmitted slip number and subtotal data are stored into the register of the terminal.

Next, as shown in FIG. 7B, when the second slip number (10741) is registered and addition key K5 is operated, the slip number and addition code data are transferred to system controller 3. Upon reception of the transferred slip data, control executes the processes of flow F72 shown in section D in FIG. 7B. In this flow, the processes similar to those in flow F71 are executed in steps S71 to S77. Due to the processes of flow F72, the slip number 10741 and the subtotal data corresponding thereto are transmitted to the terminal. The slip number and subtotal data transferred to the terminal are stored.

When addition key K5 is operated and the necessary data is stored into the terminal, the terminal executes the processes of flow F73 shown in section B in FIG. 7C. First, in step S81, the subtotal data of the respective slips is added and the sum of sales amounts is derived. Next, in step S82, an amount of sold articles which are taxed, the tax, and the like are calculated. The printing process or display process or the like is executed in step S84.

The adding operations regarding the slips of the numbers 10230 and 10741 are completed in this manner. The subtotal data stored in the terminal is cleared (step S84). Next, in order to clear the data regarding the slip numbers in memory 23 of system controller 3, the clear data and the slip numbers 10230 and 10741 are transferred to system controller 3. Upon reception of this data, control executes the processes of flow F73 in FIG. 7C and clears the corresponding subtotal data and slip number in memory 23 and the other relevant data (step S91). Further, the lending flags corresponding to the slip numbers are reset (step S92).

The case of adding the contents of two slips has been shown as a practical example as mentioned above. However, the contents of three or more slips can be also added in a manner similar to the above. In this case, by operating the closing key (addition key K5) after the last slip number was input, the sales amounts of all of the slips input are added.

(4) Ordinary closing operation

The accounting processes of one slip instead of the closing registration associated with the above adding processes are carried out as shown in FIGS. 8A and 8B. This example relates to the case where the person in charge having the ID number 456 executes the closing operation of the slip of the number 10230. In this case, as shown in section A in FIG. 8A, the personal identification number (456) is registered. Personal identification number key K8 is operated. The slip number (10230) is registered. Cash key K4 is operated. When the closing key (in this example, cash key K8) is operated, the data corresponding to the key operations (i.e., the number of the person in charge, slip number, closing code data) is transmitted to system controller 3. Control starts the processes of flow F81 in FIG. 8A. The processes similar to those shown in flow F61 in FIG. 6A or those shown in flow F71 in FIG. 7A are executed. Namely, the subtotal data corresponding to the slip number is read out of memory 23 and transferred to the terminal (steps S101 to S107). The terminal receives the data consisting of the slip number and subtotal from controller 3. Upon reception on these data, the terminal executes the processes of flow F82 shown in section B in FIG. 8B. Namely, the closing processes (i.e., the calculation of the sales amounts, calculation of the amounts which are taxed, printing process, and the like) are executed on the basis of the subtotal data transmitted (step S111). These operations are substantially the same as those in steps S81 to S83 in FIG. 7C. However, the transmitted subtotal directly becomes the sum of the sales amounts. The subtotal data in the terminal is cleared (step S112). The slip number is transmitted together with the clear data to system controller 3 (step S113). Upon reception of this data, control executes the processes of flow F83 in section D in FIG. 8B. Thus, similarly to the foregoing addition registering operations, the corresponding slip number and the subtotal data corresponding thereto and the like in memory 23 are cleared and the lending flag is reset (steps S121 and S122).

(5) Inspecting/liquidating (X/Z), and setting (P) operations

Next, the operations in the inspecting, liquidating, and setting modes will be described with reference to FIGS. 9A and 9B. The inspecting, liquidating, and setting modes are the operations to set the data in system controller 3 and inspect the recorded data, and the like.

Ordinarily, system controller 3 operates as a main station to control the timings and the like for data transmission from the terminals and the like. However, controller 3 doesn't have any keyboard and the like. It is desirable that the inspection/liquidation, and the like can be carried out by use of any terminal and the like. It is assumed that this terminal temporarily operates as a main station when it performs those operations. First, the operator sets mode switch MS of the terminal to the "X/Z" position and operates cash key K4. In the case of setting the data, the operator sets mode switch MS to the "P" position and thereafter operates setting keys, for example, a unit key (one of function keys K3) if the preset data is the unit price. Thus, the main station movement request data is sent from the terminal to system controller 3. Upon reception of this data, control starts the processes of flow F91 in section D in FIG. 9A. First, a check is made to see if the lending flags have been set or not (step S131). If at least one lending flag has been set to slip memory 23, control waits until the lending ends. When it is detected that all of the lending processes were finished (i.e., all of the lending flags were reset), control transmits the main station movement data to the terminal from which the main station movement was requested (step S132). The control routine advances to step S133 and the main station flag is reset (step S133). Control waits until the main station is returned from the terminal (which will be explained hereinafter) and when it is returned, the main station flag is set (steps S134 and S135).

In response to the transfer of the main station movement data from system controller 3, the terminal executes the processes of flow F92 in FIGS. 9A and 9B. When the main station movement data is sent from controller 3, main station flag MF of the terminal is set (step S141). Thus, the main station moves from controller 3 to the terminal. This terminal functions as a main station thereafter. In next step S142, this terminal executes the processes as the main station, for instance, the liquidating process or setting process such as collection of data, setting of data, and the like. After completion of those processes, end of main station movement key K6 is operated in this terminal. In response to the operation of key K6, the terminal sends the main station return data to controller 3. Thereafter, the main station flag is reset (steps S143 and S144). Upon liquidating and setting operations, the main station can be moved on the basis of a request from the terminal. If data is being lent from controller 3 to either one of the terminals, the main station movement is inhibited. After the main station was moved to the terminal, end of main station movement key K6 is operated. When the main station again return to system controller 3, the system becomes the ordinary state.

(6) Inspecting process

The inspecting process will then be described with reference to FIGS. 10A and 10B. This process intends to read out the subtotal data per person in charge from system controller 3 and print it. This process is also executed even while the terminal is operating.

Mode switch MS is set to the inspecting mode (X/Z) in the terminal. Upon inspection of the subtotal of only the set person in charge, the operator registers the number (123) of the person in charge and thereafter operates personal identification number key K8. In the case of inspecting the subtotals per person in charge with respect to all of the persons in charge, personal identification number key K8 is operated without registering the personal identification number. Requests for inspection of the subtotals are sent from the terminals to system controller 3. Control starts the processes of flow F101 in FIGS. 10A and 10B in response to those requests. First, the slip number is updated in step S151 (first, the initial value is set). In next step S152, a check is made to see if the number of the person in charge has been set or not. The number of person in charge is set in the case where the inspecting process of the subtotal for only the special person in charge is requested. Therefore, the control advances to step S153 and a check is made to see if the number of the person in charge of the set slip coincides with the number of the person in charge stored in slip memory 23 or not. If NO, the control advances to step S157 and a check is made to see if all of the slip numbers have been searched or not. If NO, the control is returned to step S151 and the slip number is updated. Similarly to the above, a check is made to see if the numbers of the persons in charge coincide or not. In step S153, if the stored number of the person in charge coincides with the number of the person in charge to be inspected, the control advances to step S154 and the corresponding number of the person in charge, slip number, subtotal data, and the like are transmitted to the terminal from which the inspection was requested. A check is made to see if the lending flag corresponding to this slip number has been set or not (step S155). If the corresponding lending flag has been set, step S156 follows and the machine number of the terminal to which the subtotal is lent is transmitted. The machine number is sent only while the subtotal is being lent. The above-mentioned operations are repeated until all of the slip numbers stored in memory 23 have completely been searched. FIG. 13A shows the inspecting process in the case where the person in charge is designated and shows an example of data printed on a report which is issued from the terminal. Namely, when the number of the person in charge, slip number, subtotal data, table number, and the like are sent from system controller 3, the terminal starts the inspecting process and prints the content. As shown in FIG. 13A, the name (TARO) of the person in charge is printed in the beginning of the report, then the slip number (1234), table number (2), and subtotal amount (12345) are printed per slip number. The name of the person in charge is printed only in the beginning of the report. In the printed example of FIG. 13A, the machine number is not printed; therefore, the subtotal is not lent to the terminal.

On the other hand, if the inspection of the subtotals regarding all of the persons in charge are requested, these requests are detected in step S152. The control advances to step S154 and the subtotal data and the like are sent. Steps S155 and S156 are executed. If the lending flag has been set, the machine number is transmitted in a manner similar to the above. In this case, the printed data is as shown in FIG. 13B. The name of the person in charge, slip number, table number, and subtotal are printed per slip number stored in memory 23. In step S155, if it is determined that the subtotal data has been lent, as shown in FIG. 13C, the machine number is printed after the subtotal data was printed, thereby indicating that the subtotal data has been lent. This example shows that the subtotal data of the slip number 1239 has been lent to the terminal of the machine number 03 and shows that there is the possibility such that this subtotal data is changed after that.

If it is detected in step S157 that the search of the slip numbers has been finished, the control routine advances to step S158 and the data indicative of the end of inspection is sent. Due to this, the terminal finishes the inspecting process. The open check report issued in this manner is optimum to check the sales amount per person and the crowded state of customers in the restaurant.

In FIGS. 10A and 10B, the contents stored in memory 23 are printed in accordance with the sequence of the numbers of the slips. The invention is not limited to this example but the contents stored in memory 23 may be classified and printed for every person by sequentially setting the numbers of the persons in charge in step S151 by use of a similar flowchart. In this case, the person in charge is not specified.

(7) Individual liquidation processing operation

The individual liquidating process will then be described with reference to FIGS. 11A and 11B. In the case where the customer left the restaurant without paying for articles, the data corresponding to the slip number in memory 23 is not cleared even after closing the restaurant as well. In such a case, the individual liquidating process is executed in a manner such that the operator designates the slip number and clears the memory content corresponding to the slip number. In this case, the operator registers the slip number 10230 in the liquidating mode (Z) and operates new registration key K7. Thus, the data corresponding to this key operation is transferred to system controller 3. Controller 3 receives the data transmitted and starts the processes of flow F111 in section D in FIG. 11A. Namely, the controller searches the data in memory m3 in slip memory 23 to check whether the slip number exists or not. If the slip number exists, the corresponding subtotal data is transferred to the terminal. If the corresponding slip number doesn't exist, an error occurs (steps S161 to S163).

The terminal receives the transmitted data and starts the processes of flow F112 in section B in FIG. 11. The control adds the subtotal data to the content of individual liquidation amount memory PZ in RAM 13 and stores the result into memory PZ and then prints it in step S171. The transmitted subtotal data is cleared and the clear data is transferred to system controller 3 (steps S172 and S173). Thus, controller 3 starts the processes of flow F113 and clears the subtotal data and the like corresponding to the slip number (step S181).

FIG. 14 shows an example of the printed data in this case and shows the individual liquidation number 0003, name MARY of the person who liquidated, slip number 104230, table number 3, and amount 12345. In this manner, the system according to this embodiment can also cope with the case where the customer left the restaurant without paying for the articles. The sum of amounts which were not paid is stored into memory PZ. Thus, the effective reference to prevent such a situation can be provided.

As described above, this restaurant system stores the subtotal amounts calculated on the side of the terminals into the system controller 3. Therefore, an amount of data which is transmitted is less than that in the system in which all of the data is transmitted to controller 3 and the line can be efficiently used. In addition, upon accounting, the subtotal amount corresponding to the slip number may be read out by the accounting terminal and printed on the slip; therefore, the accounting time can be remarkably reduced. Moreover, the accounting terminal is provided with the memory to accumulate the data (subtotal amount, tax, and the like) regarding the subtotal amounts upon closing. Therefore, the subtotal data can be rewritten simultaneously with the accounting operation and accumulated into the memory, so that the processes can be efficiently carried out. The present invention is not limited to the embodiment but various modifications and applications are possible within the purview of the appended claims without departing from the spirit and intended scope of the invention. For example, although it depends on the method of paying for the charge as well, the kind may be set to the table number and the subtotal may be obtained per table number by each terminal and the subtotals may be also transmitted between the systems. In addition, although the invention was applied to the restaurant system in the foregoing embodiment, the invention can be obviously also applied to other system, for example, the system which is used in hotels and the like. In this case, for example, the kind is, e.g., the room number. The terminals may be installed in the lobby, restaurant, and bar and the subtotal amount may be obtained for every room number.

What is claimed is:

1. A system for processing data related to sale of items ordered from any one of a plurality of input terminals electrically coupled to a control apparatus, comprising:

a plurality of input terminals each of which includes:

(a) first means for ordering a new set of items for a given customer by inputting slip identification data uniquely assigned to said given customer, inputting sales data representing said new set of items ordered by said given customer, and associating such inputted slip identification data with such inputted sales data, (b) arithmetic means for determining from the inputted sales data a new subtotal amount for the sales value of said new set of ordered items, and adding said new subtotal amount to a stored subtotal amount, if any, for a set of previously ordered items associated with such inputted slip identification data to obtain a current subtotal amount associated with said slip identification data; and (c) second means for transmitting to a control apparatus said inputted slip identification data and said current subtotal amount associated therewith, if any, and for receiving from said control apparatus said stored subtotal amount associated with such inputted slip identification data; and said control apparatus includes (a) first means for receiving slip identification data and said current subtotal amount associated therewith, if any, from a selected one from among said plurality of input terminals, and for transmitting from said control apparatus to said selected input terminal a subtotal amount stored in said control apparatus and associated with a slip identification data received from said selected one input terminal;

(b) second means for storing a plurality of slip identification data with respective associated current subtotal amounts; and (c) means to inhibit further transmission of the current subtotal amount associated with said received slip identification data to any input terminal after said associated current subtotal amount has been transmitted to said selected one input terminal and before a further associated subtotal has been received from said selected one input terminal.

2. The system of claim 1, wherein the first means of said control apparatus transmits a subtotal amount only to the selected one input terminal from which slip identification data associated with such subtotal amount is received.

3. The system of claim 1, wherein the first means of said control apparatus transmits both the slip identification data and its associated stored subtotal amount to said selected one input terminal.

4. The system of claim 1, wherein the first means of said control apparatus is responsive to a slip identification data and a first control signal received from said selected one input terminal for transmitting said stored subtotal amount associated with the received slip identification data, and the second means of each of said plurality of input terminals includes means for generating and transmitting said first control signal upon a new set of items being ordered by the given customer.

5. The system of claim 4, wherein the arithmetic means of each of said plurality of input terminals includes means to generate a second control signal when said current subtotal amount has been obtained corresponding to said new subtotal amount being added to said stored subtotal amount, if any, said second means of such input terminal transmitting said second control signal, and said second means of the control apparatus being responsive to said second control signal to replace the subtotal amount stored therein corresponding to a given slip identification signal, with said current subtotal amount corresponding to said given associated slip identification data.

6. The system of claim 1, wherein the inhibit means is set to inhibit transmission upon retrieval from said second means of the control apparatus of a stored subtotal amount associated with said inputted slip identification data received from said selected one input terminal apparatus, and is reset to permit transmission upon input from said selected one input terminal of a subsequently received current subtotal amount associated with such inputted slip identification data.

7. The system of claim 1, wherein each of said plurality of input terminals comprises means for storing a total of sales data, per ordered item, inputted by said first means thereof.

8. The system of claim 1, wherein the arithmetic means of each of said plurality of input terminals includes means to generate a second control signal when said current subtotal amount has been obtained corresponding to said new subtotal amount being added to said stored subtotal amount, if any, said second means of such input terminal transmitting said second control signal, and said second means of the control apparatus being responsive to said second control signal to replace the subtotal amount stored therein corresponding to a given slip identification signal, with said current subtotal amount corresponding to said given associated slip identification data.

* * * * *